J. F. CARLSON.
COMBINATION LEVEL AND PLUMB.
APPLICATION FILED FEB. 17, 1911.
1,013,274.
Patented Jan. 2, 1912.
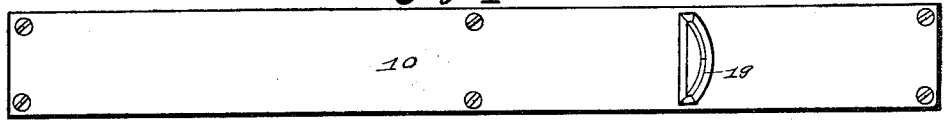
Fig. I
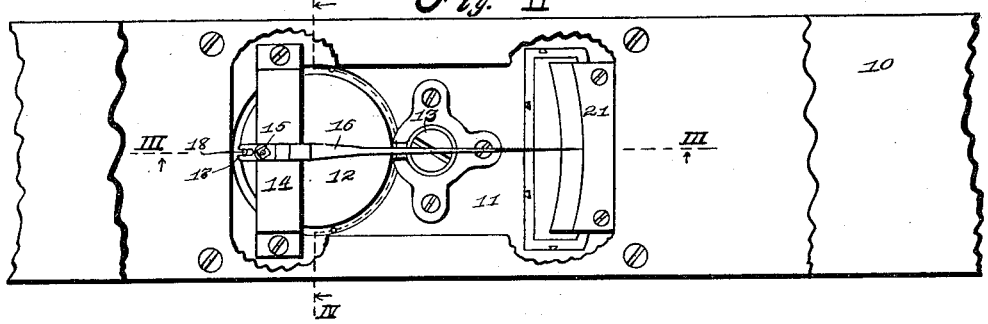
Fig. II
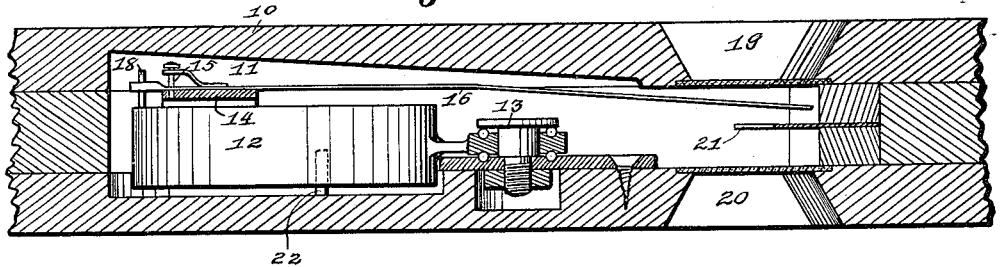
Fig. III
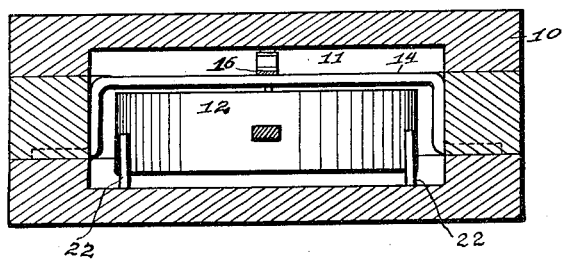
Fig. IV
Witnesses
Erle W. Miller
Frank Steiner
Inventor
John F. Carlson
By Ofell G. Roe Atty.

UNITED STATES PATENT OFFICE.

JOHN F. CARLSON, OF DES MOINES, IOWA.

COMBINATION LEVEL AND PLUMB.

1,013,274.   Specification of Letters Patent.   Patented Jan. 2, 1912.

Application filed February 17, 1911. Serial No. 609,162.

*To all whom it may concern:*

Be it known that I, JOHN F. CARLSON, a citizen of the United States, residing in Des Moines, county of Polk, and State of Iowa, have invented a new and useful Improvement in Combination Levels and Plumbs, of which the following is a specification.

The object of my invention is to provide a mechanically constructed combination level and plumb, simple, strong, durable and inexpensive, in construction, and which can be relied upon for accurately and truly indicating the inclination of the surface to which it is applied.

My invention consists of certain details of construction, hereinafter set forth, pointed out in my claim, and illustrated in the accompanying drawings, in which—

Figure I shows a plan view of my device; Fig. II shows a detail view of a part of my device, in plan, a portion of the upper strip being broken away to show the construction of the mechanical parts; Fig. III shows a sectional view taken on the line III—III, in Fig. II; and Fig. IV shows a sectional view taken on the line IV—IV in Fig. II.

Referring to the accompanying drawings the reference numeral 10 is used to indicate the block of wood, or metal, which constitutes the level, the same usually being formed of two outer strips of material, separated by an interposed strip, as shown, to form a pocket 11, in which the indicating device is mounted.

The indicating device is composed of a weight 12 pivotally suspended from an upper bearing 13, secured in the frame of the level, said weight being, preferably, secured to a depending rod, as shown. The bearing may be a ball or roller, bearing if desired to decrease friction. Near the base of the weight and extending completely across the same, its bearings being in the frame work of the level I have mounted a cross bar 14, and in the central lower portion of said cross bar is a post, or pin 15, designed as a bearing on which is mounted, for rotary movement, an indicating needle 16, its upper end projecting above the upper bearing 13. The lower extremity of said needle is broadened and extends below the post bearing 15, and is provided with a slot 17, which is open at the base and extends upwardly therefrom. This slot 17 is designed to receive a post, or pin, 18, secured to the lower central portion of the weight 12.

The sides of the level are provided with openings, 19 and 20, designed to be covered with glass, or other transparent material, through which the indicating needle 16 may be seen, and on a separate strip, 21, secured, in proper manner, in the level, a scale bar is displayed, said scale bar and needle being in such relation to each other that the oscillation of the needle will be indicated by the scale bar. I have provided posts, or pins 22, secured as shown, to limit the movement of the needle. The base of the needle below its bearing, is broadened as shown, to equalize, or nearly equalize, the weight of the needle above and below its mounting for, it is obvious, this will permit of easier operation of the needle.

From my construction, as shown and described, it is obvious that the movement of the upper part of the level, to one side or the other, will cause the needle to move in the opposite direction and the degree which the level assumes will be truly and accurately indicated on the scale bar.

Having thus described my invention what I claim and desire to secure by Letters Patent of the United States is:

A combination level and plumb comprising a block of material provided with a pocket; a weight suspended, for oscillation, in said pocket; a post centrally located on the base of said weight; a cross-bar extending across said pocket near the base of the weight; a needle mounted, for oscillation, on the central portion of said cross-bar, its lower end being slotted to receive the post on the weight, its upper extremity projecting upwardly above the weight; transparent material covering apertures which are provided in the block, and designed to reveal the upper portion of the needle; and a scale bar to indicate the degree of oscillation of the needle all arranged and combined substantially as shown and described.

JOHN F. CARLSON.

Witnesses:
E. O. ROE,
ZELL G. ROE.

---

Copies of this patent may be obtained for five cents each, by addressing the "Commissioner of Patents, Washington, D. C."